United States Patent
Boddakayala et al.

(10) Patent No.: US 12,548,856 B2
(45) Date of Patent: Feb. 10, 2026

(54) THERMAL BARRIER INTEGRATED BUSBAR SYSTEMS FOR TRACTION BATTERY PACKS

(71) Applicant: FORD GLOBAL TECHNOLOGIES, LLC, Dearborn, MI (US)

(72) Inventors: Bhaskara Rao Boddakayala, Troy, MI (US); Joseph Ravenscroft, Dearborn, MI (US); Steve F. Chorian, Canton, MI (US); Michael Barr, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 798 days.

(21) Appl. No.: 17/938,383

(22) Filed: Oct. 6, 2022

(65) Prior Publication Data

US 2024/0120622 A1  Apr. 11, 2024

(51) Int. Cl.
*H01M 50/505* (2021.01)
*H01M 10/625* (2014.01)
*H01M 10/658* (2014.01)

(52) U.S. Cl.
CPC ....... *H01M 50/505* (2021.01); *H01M 10/625* (2015.04); *H01M 10/658* (2015.04)

(58) Field of Classification Search
CPC ......... H01M 2200/103; H01M 10/658; H01M 50/505; H01M 50/507; H01M 50/584; H01M 50/588; H01M 50/591; H01M 50/593; H01M 50/143; H01M 50/583
See application file for complete search history.

(56) References Cited

U.S. PATENT DOCUMENTS

| | | | |
|---|---|---|---|
| 9,331,325 B2 | 5/2016 | Lim | |
| 10,651,521 B2 | 5/2020 | Onnerud et al. | |
| 10,784,492 B2 | 9/2020 | Onnerud et al. | |
| 10,964,988 B2 | 3/2021 | Fernandez-Galindo et al. | |
| 2015/0165926 A1 | 6/2015 | Kim et al. | |
| 2017/0003349 A1* | 1/2017 | Dawley | H01M 50/507 |
| 2019/0181419 A1 | 6/2019 | Suba et al. | |
| 2020/0381697 A1 | 12/2020 | Fernandez-Galindo et al. | |
| 2021/0193982 A1 | 6/2021 | Ma et al. | |
| 2022/0021046 A1 | 1/2022 | Shi et al. | |
| 2023/0087017 A1* | 3/2023 | Xiao | H01M 50/394 429/120 |
| 2023/0253681 A1* | 8/2023 | Ju | H01M 10/658 429/163 |

\* cited by examiner

*Primary Examiner* — Christopher P Domone
(74) *Attorney, Agent, or Firm* — David B. Kelley; Carlson, Gaskey & Olds, P.C.

(57) ABSTRACT

Busbar systems are provided for use within traction battery packs. The busbar systems may include one or more integrated thermal barriers for mitigating the effects of battery thermal events. The thermal barriers may be integrated as part of an outer housing of the busbar system, as part of a fuse area of a busbar of the busbar system, or both.

15 Claims, 4 Drawing Sheets

THERMAL BARRIER INTEGRATED BUSBAR SYSTEMS FOR TRACTION BATTERY PACKS

TECHNICAL FIELD

This disclosure relates generally to electrified vehicle traction battery packs, and more particularly to thermal barrier integrated busbar systems designed for mitigating the effects of battery thermal events.

BACKGROUND

A high voltage traction battery pack typically powers the electric machines and other electrical loads of an electrified vehicle. The traction battery pack includes a plurality of battery cells and various other battery internal components that must be reliably connected to achieve the necessary voltage and power levels for supporting the electric propulsion of the vehicles.

SUMMARY

A busbar system for a traction battery pack according to an exemplary aspect of the present disclosure includes, among other things, an outer housing, a busbar housed within the outer housing, and a thermal barrier integrated as part of the outer housing, the busbar, or both.

In a further non-limiting embodiment of the foregoing busbar system, the thermal barrier includes an endothermic intumescent aerogel sheet.

In a further non-limiting embodiment of either of the foregoing busbar systems, the endothermic intumescent aerogel sheet includes a non-woven ceramic fiber that includes an integrated intumescent filler.

In a further non-limiting embodiment of any of the foregoing busbar systems, the busbar includes a fuse area having a fuse link.

In a further non-limiting embodiment of any of the foregoing busbar systems, the fuse link is sandwiched between a first endothermic intumescent aerogel sheet and a second endothermic intumescent aerogel sheet of the thermal barrier.

In a further non-limiting embodiment of any of the foregoing busbar systems, the first endothermic intumescent aerogel sheet and the second endothermic intumescent aerogel sheet are configured to expand in response to thermal energy to partition the fuse area into a first subarea and a second subarea.

In a further non-limiting embodiment of any of the foregoing busbar systems, the thermal barrier is established by a material of the outer housing.

In a further non-limiting embodiment of any of the foregoing busbar systems, the material includes a high temperature thermoplastic.

In a further non-limiting embodiment of any of the foregoing busbar systems, the material includes a flame retardant glass fiber reinforced polypropylene.

In a further non-limiting embodiment of any of the foregoing busbar systems, the material includes a high flow halogen free flame retardant homopolymer with at least 30% glass fiber.

In a further non-limiting embodiment of any of the foregoing busbar systems, the thermal barrier includes a thermally activated strip secured to a portion of the outer housing.

In a further non-limiting embodiment of any of the foregoing busbar systems, the thermally activated strip includes an endothermic intumescent aerogel.

A traction battery pack according to another exemplary aspect of the present disclosure includes, among other things, a first battery array, a second battery array, and busbar system arranged to electrically connect the first battery array to the second battery array. The busbar system includes a first thermal barrier integrated as part of an outer housing of the busbar system, a second thermal barrier associated with a fuse area of a busbar of the busbar system, or both.

In a further non-limiting embodiment of the foregoing traction battery pack, the first thermal barrier includes a high temperature thermoplastic material with flame retardant properties.

In a further non-limiting embodiment of either of the foregoing traction battery packs, the high temperature thermoplastic with flame retardant properties includes a glass fiber reinforced polypropylene.

In a further non-limiting embodiment of any of the foregoing traction battery packs, the second thermal barrier includes an endothermic intumescent aerogel sheet.

In a further non-limiting embodiment of any of the foregoing traction battery packs, the endothermic intumescent aerogel sheet is secured to a fuse link of the fuse area.

In a further non-limiting embodiment of any of the foregoing traction battery packs, the endothermic intumescent aerogel sheet is secured to the outer housing.

In a further non-limiting embodiment of any of the foregoing traction battery packs, a fuse link of the fuse area is sandwiched between a first endothermic intumescent aerogel sheet and a second endothermic intumescent aerogel sheet of the second thermal barrier.

In a further non-limiting embodiment of any of the foregoing traction battery packs, the first endothermic intumescent aerogel sheet and the second endothermic intumescent aerogel sheet are configured to expand in response to thermal energy to partition the fuse area into a first subarea and a second subarea.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary busbar systems for use within traction battery packs. The busbar systems may include one or more integrated thermal barriers for mitigating the effects of battery thermal events. The thermal barriers may be integrated as part of an outer housing of the busbar system, as part of a fuse area of a busbar of the busbar system, or both. These and other features are discussed in greater detail in the following paragraphs of this detailed description.

Figure 1:
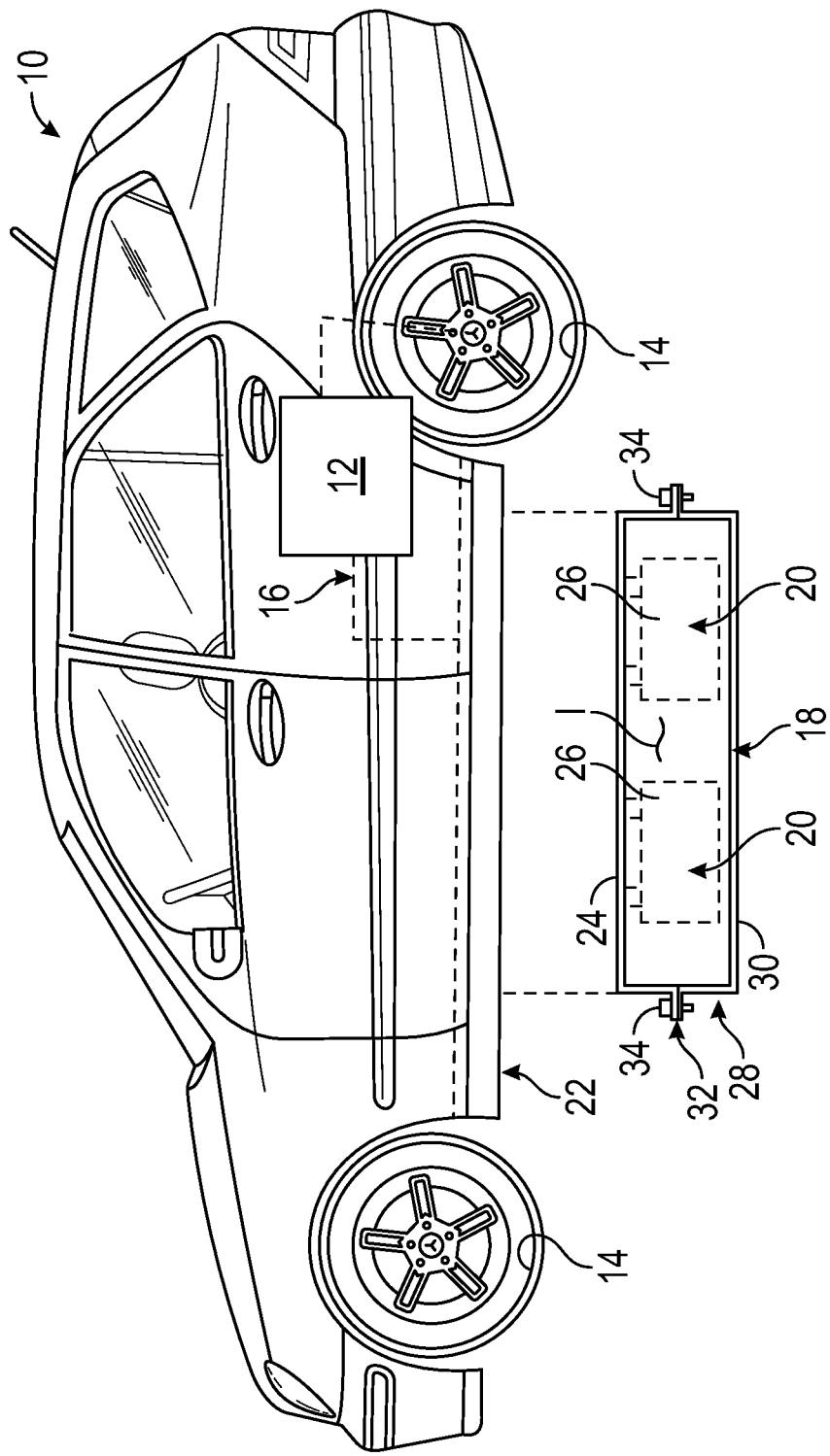
FIG. 1 schematically illustrates an electrified vehicle that includes a traction battery pack.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In the illustrated embodiment, the electrified vehicle 10 is a sport utility vehicle (SUV). However, the electrified vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack that includes one or more battery arrays 20 (i.e., battery assemblies or groupings of rechargeable battery cells 26) capable of outputting electrical power to power the electric machine 12 and/or other electrical loads of the electrified vehicle 10. Other types of energy storage devices and/or output devices could alternatively or additionally be used to electrically power the electrified vehicle 10.

The battery cells 26 may be stacked side-by-side along a stack axis to construct a grouping of battery cells 26, sometimes referred to as a "cell stack." In the highly schematic depiction of FIG. 1, the battery cells 26 are stacked in a direction into the page to construct each battery array 20, and thus the battery arrays 20 extend in cross-car direction. However, other configurations may also be possible.

The total number of battery arrays 20 and battery cells 26 provided within the traction battery pack 18 is not intended to limit this disclosure. In an embodiment, the battery cells 26 of each battery array 20 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The traction battery pack 18 may be secured to an underbody 22 of the electrified vehicle 10. However, the traction battery pack 18 could be located elsewhere on the electrified vehicle 10 within the scope of this disclosure.

An outer enclosure assembly 28 may house each battery array 20 of the traction battery pack 18. The outer enclosure assembly 28 may be a sealed enclosure and may embody any size, shape, and configuration within the scope of this disclosure. In an embodiment, the outer enclosure assembly 28 includes an enclosure cover 24 and an enclosure tray 30. Together, the enclosure cover 24 and the enclosure tray 30 may establish an interior I for housing the battery arrays 20 and other battery internal components (e.g., bussed electrical center, battery electric control module, wiring, connectors, etc.) of the traction battery pack 18.

During assembly of the traction battery pack 18, the enclosure cover 24 may be secured to the enclosure tray 30 at an interface 32 therebetween. The interface 32 may substantially circumscribe the interior I. In some implementations, mechanical fasteners 34 may be used to secure the enclosure cover 24 to the enclosure tray 30, although other fastening methodologies (adhesion, etc.) could also be suitable.

From time to time, pressure and thermal energy within one or more of the battery cells 26 can increase. The pressure and thermal energy increase can be due to an overcharge condition or an overdischarging condition, for example. The pressure and thermal energy increase can cause the associated battery cell 26 to rupture and release gas from within an interior of the associated battery cell 26. The gases may be caused by an applied force or a thermal event, and can either cause or exacerbate an existing battery thermal event. A relatively significant amount of heat can be generated during battery thermal events, and this heat can sometimes cascade from array-to-array within the traction battery pack 18. This disclosure is therefore directed to busbar system designs that incorporate thermal barriers for mitigating the effects of battery thermal events.

Figure 2:
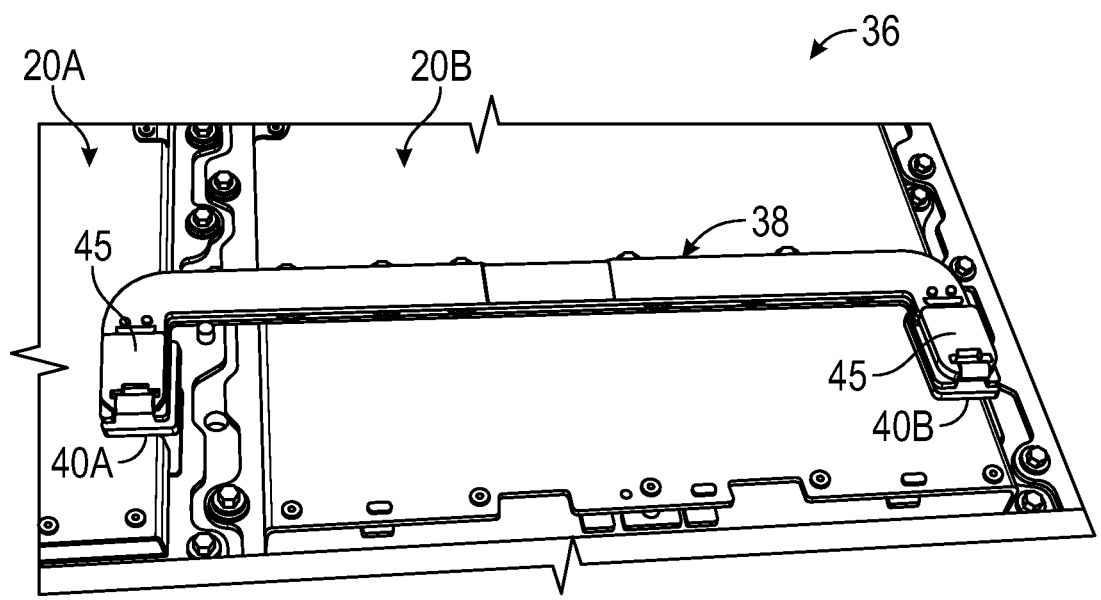
FIG. 2 illustrates a battery system of a traction battery pack.

FIG. 2 illustrates an exemplary battery system 36 for a traction battery pack, such as the traction battery pack 18 of FIG. 1, for example. The battery system 36 may include a first battery array 20A, a second battery array 20B, and a busbar system 38 for electrically connecting the first and second battery arrays 20A, 20B. Although two battery arrays and one busbar system are shown as part of the battery system 36 of FIG. 2, the battery system 36 could include a greater number of battery arrays and busbar systems within the scope of this disclosure.

The busbar system 38 may connect the first and second battery arrays 20A, 20B in either a series string configuration or a parallel string configuration. The busbar system 38 could be snap fit, welded, bolted, clipped, or otherwise attached to each of the first battery array 20A and the second battery array 20B. In an embodiment, the busbar system 38 is connected to each of a first high voltage terminal 40A of the first battery array 20A and a second high voltage terminal 40B of the second battery array 20B for electrically connecting the first and second battery arrays 20A, 20B. The second high voltage terminal 40B may have the same polarity (e.g., for a parallel string configuration) or a different polarity (e.g., for a series string configuration) as the first high voltage terminal 40A.

Figure 3:
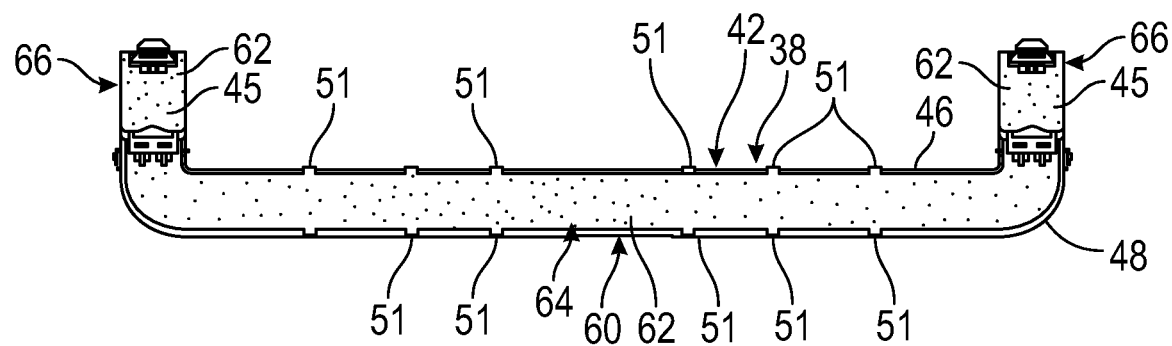
FIG. 3 illustrates a busbar system of the battery system of FIG. 2.
Figure 4:
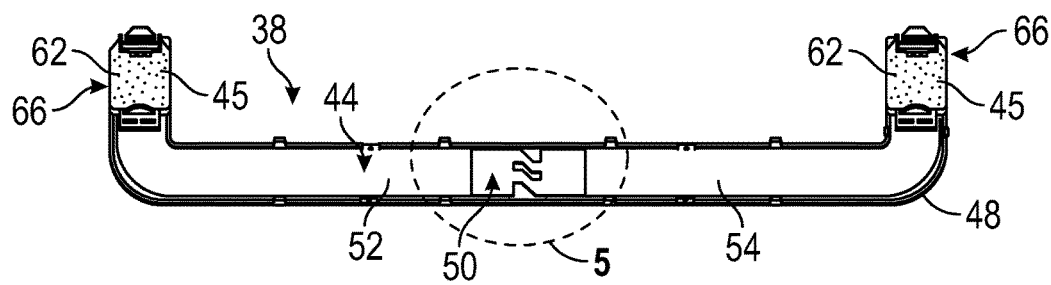
FIG. 4 illustrates the busbar system of FIG. 3 with portions of an outer housing removed.
Figure 5:
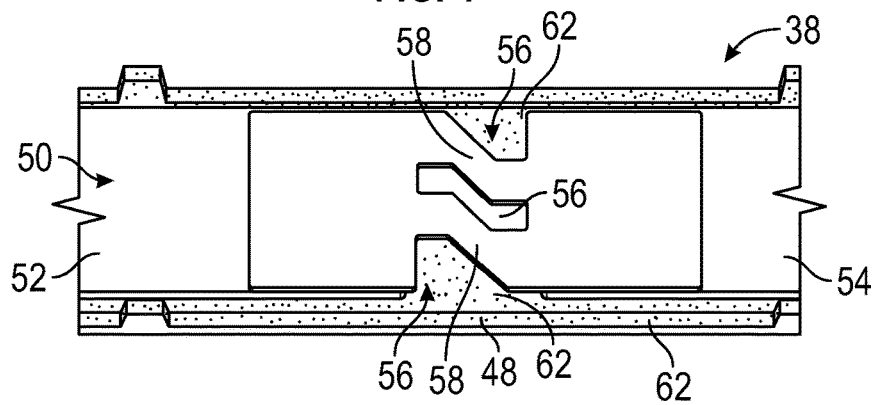
FIG. 5 is a blown up view of portions of a fuse area of the busbar system of FIG. 4.

FIGS. 3, 4, and 5 illustrate further details associated with the busbar system 38 of FIG. 2. The busbar system 38 may include an outer housing 42 and a busbar 44 housed inside the outer housing 42. In an embodiment, the outer housing 42 may be overmolded around the busbar 44. However, the busbar 44 could be contained within the interior of outer housing 42 in any known manner.

The outer housing 42 may include an upper housing section 46 and a lower housing section 48. The upper housing section 46 may be connected to the lower housing section 48 by a plurality of snap connectors 51 to establish a clamshell-like design. The upper housing section 46 may therefore be removable from the lower housing section 48 for accessing the busbar 44.

The outer housing 42 may further include a pair of covers 45. The covers 45 may be hingedly connected to the upper housing section 46. The covers 45 may be pivoted to an open position to expose portions of the busbar 44, the first high voltage terminal 40A, and/or the second high voltage terminal 40B.

The busbar 44 may be a relatively thin strip of metal that is configured to conduct the power stored by the battery cells 26 of the first and second battery arrays 20A, 20B. The busbar 44 may be capable of carrying relatively high amperage capacities. In an embodiment, the busbar 44 is made of a metallic material, such as copper, aluminum, or brass. However, other materials are also contemplated within the scope of this disclosure.

The busbar 44 may include a fuse area 50 (see FIGS. 4 and 5) located between a first busbar section 52 and a second busbar section 54. In an embodiment, the fuse area 50 may be sonic welded to each of the first busbar section 52 and the second busbar section 54. However, the fuse area 50 could be joined to the first and second busbar sections 52, 54 in any known manner.

One or more notches 56 may be formed in the fuse area 50. The notches 56 may establish one or more fuse links 58 within the fuse area 50. Each fuse link 58 is essentially a narrowed portion of the busbar 44. In the event of a relatively high current event (e.g., a short circuit event), the busbar 44 may sever (e.g., melt) at the fuse link(s) 58 to break the circuit, thereby electrically isolating the first and second battery arrays 20A, 20B from one another and thus mitigating the array-to-array transfer of the short circuit event.

The busbar system 38 may further include one or more integrated thermal barriers for mitigating/preventing certain conditions that can arise during battery thermal events. For example, among other benefits, the integrated thermal barriers of the busbar system 38 may be configured to thermally insulate adjacent battery arrays from one another, prolong the amount of time it takes for electrical energy to transfer from array-to-array during battery thermal events, render the battery system 36 less susceptible to array-to-array short circuit transfers, etc.

A first thermal barrier 60 may be integrated as part of the outer housing 42 of the busbar system 38. For example, the first thermal barrier 60 may be established by a material 62 of the outer housing 42. The material 62 may be incorporated into the upper housing section 46, the lower housing section 48, or both.

The material 62 may be a high temperature thermoplastic with flame retardant properties. In an embodiment, the material 62 is a flame retardant glass fiber reinforced polypropylene. In another embodiment, the material 62 is a high flow, halogen free flame retardant homopolymer with at least 30% glass fiber. However, other materials and combinations of materials could be incorporated as part of the material 62.

The material 62 may be configured to withstand relatively high temperatures that can develop within the busbar system 38, such as during battery thermal events of the traction battery pack 18. For example, the material 62 may be configured to withstand temperatures of about 700°-800° C. for a continuous exposure of about 5 minutes. The material 62 may further be configured to withstand temperatures of up to about 1000° C. for a short duration (e.g., less than about 40 seconds). In this disclosure, the term "about" means that the expressed quantities or ranges need not be exact but may be approximated and/or larger or smaller, reflecting acceptable tolerances, conversion factors, measurement error, etc.

The material 62 may be further configured to provide a relatively high amount of heat deflection. This allows the busbar 44 to act as a heat sink during battery thermal events, thereby enhancing the durability of the outer housing 42 of the busbar system 38.

The material 62 may be dispersed throughout an entirety of the outer housing 42 or could be confined to select portions thereof. For example, the material 62 could be provided only at a first portion 64 of the outer housing 42 that surrounds the fuse area 50 and second portions 66 that surround the portions of the busbar 44 that connect to the high voltage terminals 40A, 40B.

Figure 6:
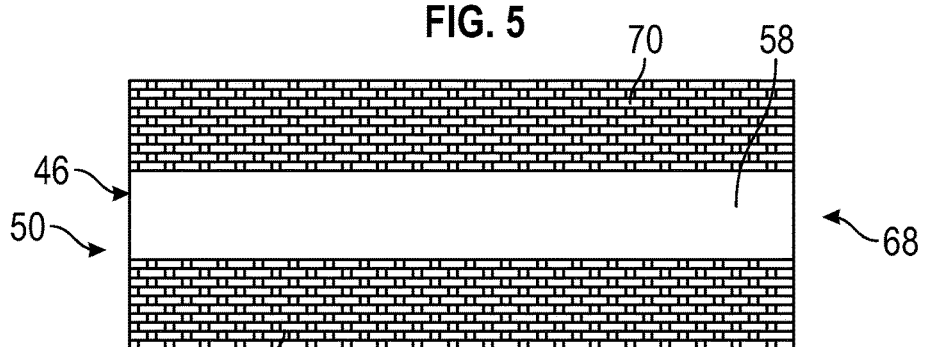
FIG. 6 illustrates a thermal barrier integrated within the fuse area of the busbar system of FIGS. 4 and 5.
Figure 7:
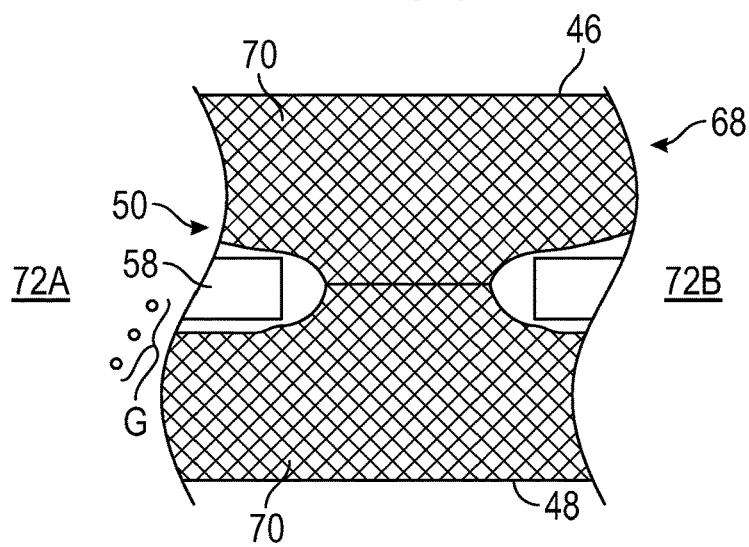
FIG. 7 illustrates an expanded position of the thermal barrier of FIG. 6.

Referring now primarily to FIGS. 6 and 7, a second thermal barrier 68 may be integrated as part of the fuse area 50 of the busbar 44 of the busbar system 38. The second thermal barrier 68 may include one or more endothermic intumescent aerogel sheets 70. In an embodiment, each fuse link 58 of the fuse area 50 is sandwiched between a pair of the endothermic intumescent aerogel sheets 70. Notably, the various layers of the fuse area 50 and the second thermal barrier 68 are not drawn to scale, and in the interests of simplicity and clarity, are shown in a highly schematic manner within these figures.

In an embodiment, each endothermic intumescent aerogel sheet 70 is a non-woven ceramic fiber that includes integrated fillers (e.g., aluminum trihydrate, sodium silicate, etc.) for providing endothermic and intumescent qualities. However, the endothermic intumescent aerogel sheets 70 could be constructed from other thermally activated materials or combinations of thermally activated materials.

Each endothermic intumescent aerogel sheet 70 may be configured to both absorb heat and expand during battery thermal events. During ordinary operation when none of the battery cells 26 are experiencing a thermal event and thermal energy levels within the busbar system 38 are not sufficient to activate the endothermic intumescent aerogel sheets 70, the endothermic intumescent aerogel sheets 70 may remain in an unexpanded state (see FIG. 6). However, when the temperature within or surrounding the busbar system 38 exceeds a predefined temperature threshold (e.g., between about 120° C. and about 200° C.), the endothermic intumescent aerogel sheets 70 may expand from the unexpanded position shown in FIG. 6 to the expanded position shown in FIG. 7.

The endothermic intumescent aerogel sheets 70 may expand outwardly to contact one another and contact the upper and lower housing sections 46, 48 of the outer housing 42 to partition the fuse area 50 into a first subarea 72A and a second subarea 72B. Accordingly, when expanded, the endothermic intumescent aerogel sheets 70 create a barrier that partitions the fuse area 50 into the first subarea 72A and the second subarea 72B.

The barrier established by the endothermic intumescent aerogel sheets 70 can fluidly isolate the first subarea 72A from the second subarea 72B. When the first subarea 72A is partitioned from the second subarea 72B, debris G, such as from a severed fuse link 58, is contained within the first subarea 72A and cannot enter the second subarea 72B. The debris G is thus prevented from establishing a conductive pathway between the battery arrays 20A, 20B, thereby mitigating the likelihood of transferring a short circuit condition from array-to-array.

Furthermore, by establishing the thermal barrier between neighboring battery arrays 20A, 20B, the amount of time required for heat to transfer through thermally conductive connections of the busbar system 38 can be prolonged. The expanding endothermic intumescent aerogel sheets 70 may also absorb heat energy from the busbar system 38 during the battery thermal event by containing at least portions of the convective effects of gasses and other effluents, thereby minimizing any array-to-array transfer of the gases/effluents.

Figure 8:
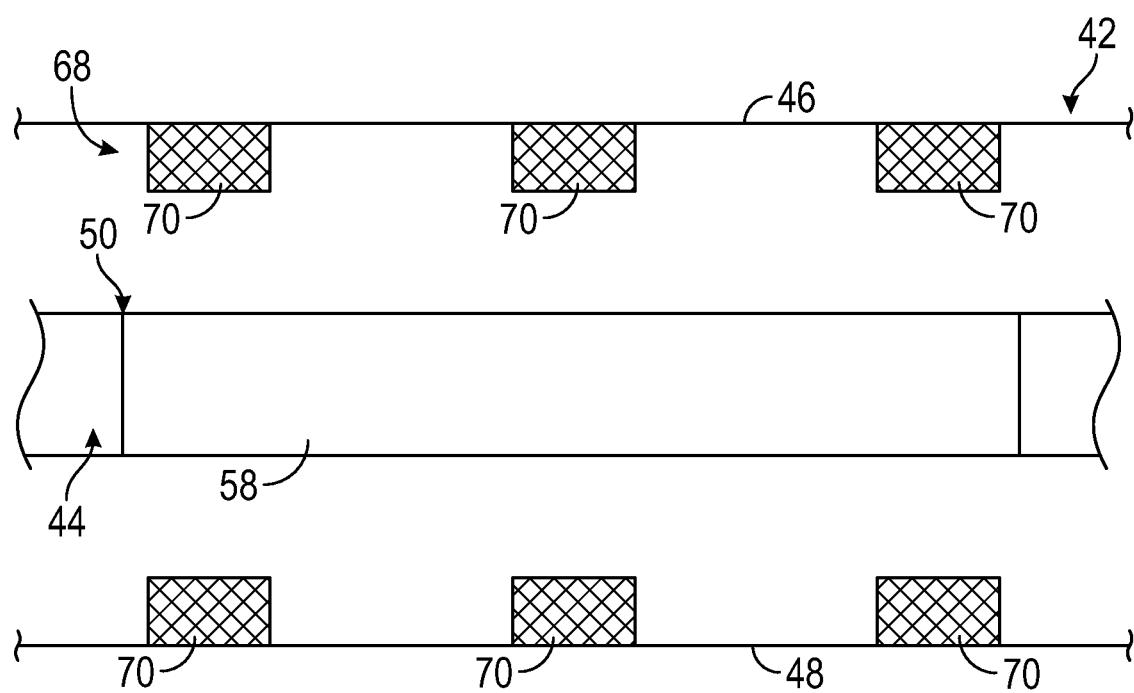
FIG. 8 illustrates another exemplary thermal barrier for a busbar system.

In another embodiment, shown in FIG. 8, the endothermic intumescent aerogel sheets 70 that establish the second thermal barrier 68 may be configured as thermally activated strips that are secured to portions of the outer housing 42. For example, the strips of the endothermic intumescent aerogel sheets 70 may be secured to portions of the upper housing section 46 and the lower housing section 48 that surround the fuse area 50 and may expand to create a barrier across the fuse area 50 when the temperature within the busbar system 38 exceeds the predefined temperature threshold.

The exemplary busbar systems of this disclosure are designed to incorporate one or more thermal barriers for mitigating the effects of battery thermal events within a traction battery pack. The systems may provide numerous advantages over known solutions, including but not limited to presenting a novel configuration that significantly slows or even prevents the array-to-array transfer of the battery thermal event via the busbar system.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A busbar system for a traction battery pack, comprising:
an outer housing;
a busbar housed within the outer housing; and
a thermal barrier integrated as part of the outer housing, the busbar, or both,
wherein the busbar includes a fuse area having a fuse link that is positioned between a first endothermic intumescent aerogel sheet and a second endothermic intumescent aerogel sheet of the thermal barrier.

2. The busbar system as recited in claim 1, wherein the thermal barrier includes an endothermic intumescent aerogel sheet.

3. The busbar system as recited in claim 2, wherein the endothermic intumescent aerogel sheet includes a nonwoven ceramic fiber that includes an integrated intumescent filler.

4. The busbar system as recited in claim 1, wherein the first endothermic intumescent aerogel sheet and the second endothermic intumescent aerogel sheet are configured to expand in response to thermal energy to partition the fuse area into a first subarea and a second subarea.

5. The busbar system as recited in claim 1, wherein the thermal barrier is established by a material of the outer housing.

6. The busbar system as recited in claim 5, wherein the material includes a high temperature thermoplastic.

7. The busbar system as recited in claim 5, wherein the material includes a flame retardant glass fiber reinforced polypropylene.

8. The busbar system as recited in claim 5, wherein the material includes a high flow halogen free flame retardant homopolymer with at least 30% glass fiber.

9. The busbar system as recited in claim 1, wherein the thermal barrier includes a thermally activated strip secured to a portion of the outer housing.

10. The busbar system as recited in claim 9, wherein the thermally activated strip includes an endothermic intumescent aerogel.

11. A traction battery pack, comprising:
a first battery array;
a second battery array; and
a busbar system arranged to electrically connect the first battery array to the second battery array,
wherein the busbar system includes a first thermal barrier integrated as part of an outer housing of the busbar system, a second thermal barrier associated with a fuse area of a busbar of the busbar system, or both,
wherein the second thermal barrier includes an endothermic intumescent aerogel sheet that is secured to a fuse link of the fuse area or to the outer housing.

12. The traction battery pack as recited in claim 11, wherein the first thermal barrier includes a high temperature thermoplastic material with flame retardant properties.

13. The traction battery pack as recited in claim 12, wherein the high temperature thermoplastic material with flame retardant properties includes a glass fiber reinforced polypropylene.

14. A traction battery pack, comprising:
a first battery array:
a second battery array; and
a busbar system arranged to electrically connect the first battery array to the second battery array,
wherein the busbar system includes a thermal barrier associated with a fuse area of a busbar of the busbar system,
wherein a fuse link of the fuse area is positioned between a first endothermic intumescent aerogel sheet and a second endothermic intumescent aerogel sheet of the thermal barrier.

15. The traction battery pack as recited in claim 14, wherein the first endothermic intumescent aerogel sheet and the second endothermic intumescent aerogel sheet are configured to expand in response to thermal energy to partition the fuse area into a first subarea and a second subarea.

\* \* \* \* \*